United States Patent
Leuschner et al.

(10) Patent No.: US 12,236,124 B2
(45) Date of Patent: Feb. 25, 2025

(54) SYSTEM AND METHOD FOR DEFINING FILES ON DISK TO BE WRITTEN TO TAPE IN A SPECIFIED MANNER

(71) Applicant: QUANTUM CORPORATION, San Jose, CA (US)

(72) Inventors: Jeff Leuschner, Wylie, TX (US); Doug Burling, Plano, TX (US); Tony Catano, Dallas, TX (US)

(73) Assignee: Quantum Corporation, Centennial, CO (US)

(*) Notice: Subject to any disclaimer, the term of this patent is extended or adjusted under 35 U.S.C. 154(b) by 32 days.

(21) Appl. No.: 18/106,796

(22) Filed: Feb. 7, 2023

(65) Prior Publication Data
US 2023/0259296 A1  Aug. 17, 2023

Related U.S. Application Data

(60) Provisional application No. 63/310,060, filed on Feb. 14, 2022.

(51) Int. Cl.
G06F 3/00 (2006.01)
G06F 3/06 (2006.01)

(52) U.S. Cl.
CPC ........... *G06F 3/065* (2013.01); *G06F 3/0604* (2013.01); *G06F 3/0683* (2013.01)

(58) Field of Classification Search
None
See application file for complete search history.

(56) References Cited

U.S. PATENT DOCUMENTS 8,099,572 B1 * 1/2012 Arora .................. G06F 13/28
711/E12.013
2015/0221203 A1 * 8/2015 Concepcion ....... G05B 23/0227
340/870.09

* cited by examiner

*Primary Examiner* — Midys Rojas
(74) *Attorney, Agent, or Firm* — Wolf, Greenfield & Sacks, P.C.

(57) ABSTRACT

A method for copying a plurality of files from a first file system to a tape-based file system, includes the steps of ingesting the plurality of files into the first file system, the first file system including a first system controller including a processor; assigning each of the plurality of files within the file system to a group with a file system application to create at least one file group; defining a desired order of the files in each of the at least one file group with the file system application to create at least one ordered file group; indicating when the at least one ordered file group is ready to be written to tape with the file system application to create at least one ready, ordered file group; and copying each of the at least one ordered file group with the first system controller to be written to the tape-based file system.

18 Claims, 4 Drawing Sheets

SYSTEM AND METHOD FOR DEFINING FILES ON DISK TO BE WRITTEN TO TAPE IN A SPECIFIED MANNER

RELATED APPLICATION

This application claims priority on U.S. Provisional Application Ser. No. 63/310,060, filed on Feb. 14, 2022. As far as permitted, the contents of U.S. Provisional Application Ser. No. 63/310,060 are incorporated in their entirety herein by reference.

BACKGROUND

A file system may be defined as a way of storing data in a particular manner so that it can be located quickly and easily when required. Thus, the main purpose of the file system is to make it easy for the users and operating system to store the files in a specified manner so that all parties can store or retrieve the files with ease.

Disk file systems take advantage of the ability of disk storage media to randomly address data in a short amount of time. Additional considerations include the speed of accessing data following that initially requested and the anticipation that the following data may also be requested. This permits multiple users (or processes) access to various data on the disk without regard to the sequential location of the data. Conversely, tape file systems are file systems and tape formats designed to store files on tape. Magnetic tapes are sequential storage media with significantly longer random data access times than disks, posing challenges to the creation and efficient management of a general-purpose file system.

In certain situations, customers or users may have files saved on disk (within a disk file system) that they want to subsequently store to tape (within a tape file system), such as for archiving purposes and/or for any other suitable reasons. In such situations, the customer or user may appreciate a mechanism through which they can indicate a desired grouping of files such that the files on the disk may be stored on the tape in a specified manner to enhance speed and ease of access to desired files from the tape. Accordingly, it is desired to develop a system and method to enable the customers or users to save files from disk to tape in a specified manner.

SUMMARY

The present invention is directed toward a method for copying a plurality of files from a first file system to a tape-based file system. In various embodiments, the method includes the steps of ingesting the plurality of files into the first file system, the first file system including a first system controller including a processor; assigning each of the plurality of files within the file system to a group with a file system application to create at least one file group; defining a desired order of the files in each of the at least one file group with the file system application to create at least one ordered file group; and copying each of the at least one ordered file group with the first system controller to be written to the tape-based file system.

In some embodiments, the step of ingesting includes ingesting the plurality of files into a disk-based file system.

In certain embodiments, the step of ingesting includes the file system including file system software. In some embodiments, the step of assigning includes the file system application being a software application. In certain embodiments, the method further includes the step of integrating the file system application with the file system software.

In some embodiments, the method further includes the step of erasure encoding each of the plurality of files as the files enter the first file system.

In certain embodiments, the step of assigning includes each of the plurality of files being assigned to only one of the at least one file group.

In many embodiments, the step of assigning each of the plurality of files includes assigning a Group ID attribute value to each of the plurality of files with the file system application to create the at least one file group. In some embodiments, each Group ID attribute value is used to identify only one file group.

In certain embodiments, the step of defining includes assigning a File Index attribute value to each of the files in the at least one file group with the file system application to create the at least one ordered file group.

In various embodiments, the method further includes the step of indicating when the at least one ordered file group is ready to be written to tape with the file system application to create at least one ready, ordered file group prior to the step of copying each of the at least one ordered file group with the first system controller to be written to the tape-based file system.

In some embodiments, the step of indicating includes assigning a Group Ready attribute value to one of the files in each of the at least one ordered file group with the file system application.

In certain embodiments, the tape-based file system includes a system controller including a processor. In many embodiments, the method further comprises the step of retrieving each of the at least one ordered file group from the tape-based file system utilizing the system controller of the tape-based file system.

The present invention is further directed toward a file system usable for copying a plurality of files to a tape-based file system, the file system including a system controller including a processor; and a file system application that is usable for performing the following steps after the plurality of files has been ingested into the file system: assigning each of the plurality of files within the file system to a group to create at least one file group; and defining a desired order of the files in each of the at least one file group to create at least one ordered file group; and wherein the system controller is configured for copying each of the at least one ordered file group to be written to the tape-based file system.

The present invention is also directed toward a method for copying a plurality of files from a first file system to a tape-based file system, including the steps of ingesting the plurality of files into a disk-based file system, the disk-based file system including file system software; integrating a file system application with the file system software, the file system application being a software application; assigning a Group ID attribute value to each of the plurality of files within the file system with the file system application to create at least one file group, each of the plurality of files being assigned to only one of the at least one file group; defining a desired order of the files in each of the at least one file group with the file system application by assigning a File Index attribute value to each of the files in the at least one file group to create at least one ordered file group; indicating when the at least one ordered file group is ready to be written to tape with the file system application by assigning a Group Ready attribute value to one of the files in each of the at least one ordered file group to create at least one ready, ordered file group; and copying each of the at least one ready, ordered file group to be written to tape.

BRIEF DESCRIPTION OF THE DRAWINGS

The novel features of this invention, as well as the invention itself, both as to its structure and its operation, will be best understood from the accompanying drawings, taken in conjunction with the accompanying description, in which similar reference characters refer to similar parts, and in which.

Figure 1:
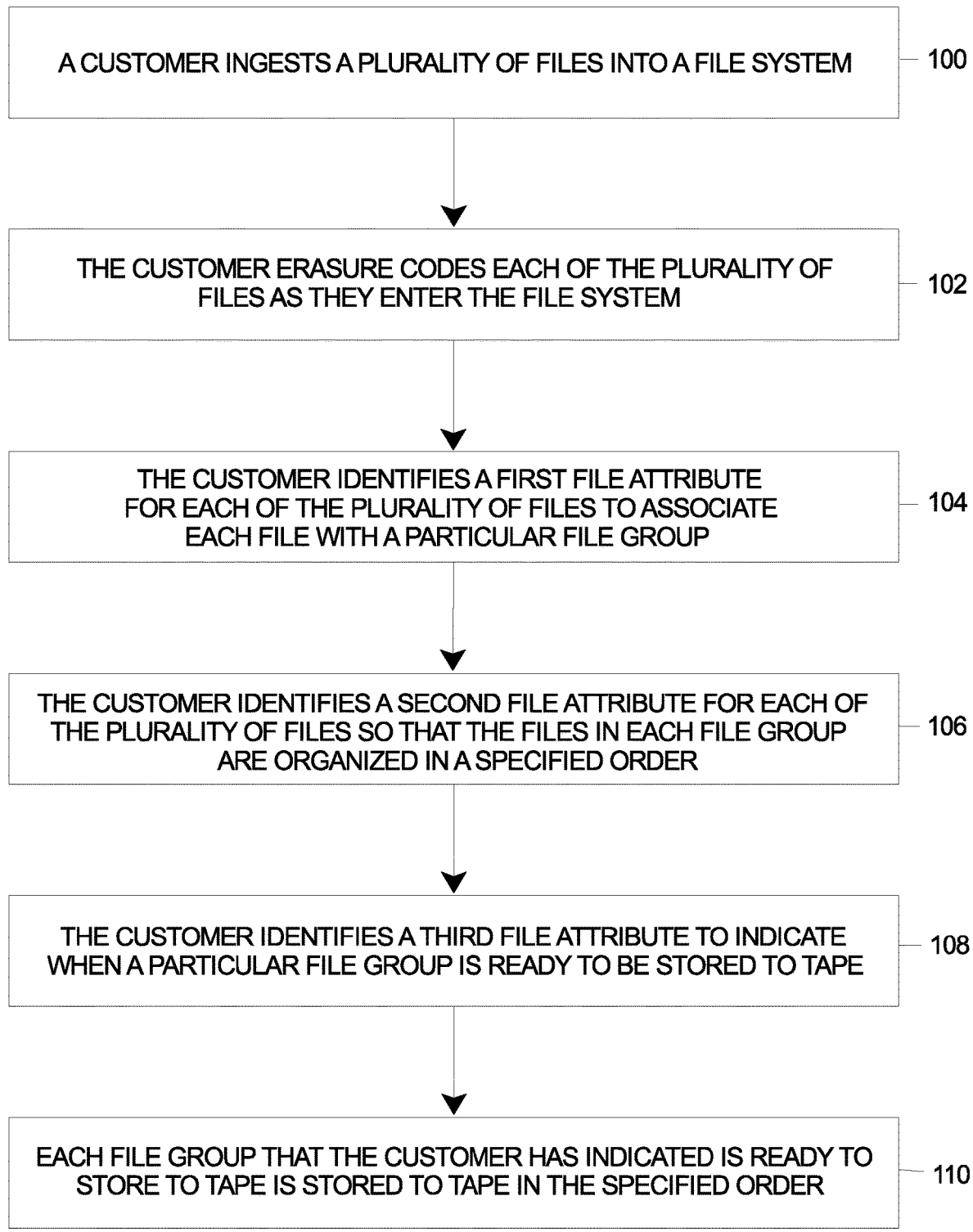
FIG. 1 is a simplified flowchart that illustrates a representative usage of an embodiment of a file system application having features of the present invention.

While embodiments of the present invention are susceptible to various modifications and alternative forms, specifics thereof have been shown by way of example and drawings, and are described in detail herein. It is understood, however, that the scope herein is not limited to the particular embodiments described. On the contrary, the intention is to cover modifications, equivalents, and alternatives falling within the spirit and scope herein.

DESCRIPTION

Embodiments of the present invention are described herein in the context of a system and method for defining and ordering files on disk, such as within a Linux file system or other suitable file system, to be written to tape in a specified manner. In particular, in any given instance, a customer may have files on disk that they want to store to tape, such as for archiving purposes and/or for any other suitable reasons. In order that the customer can have the files saved on tape in particular groups and in particular orders, the customer would like a mechanism to indicate the grouping of files such that all of the files in a particular group are stored to the same tape. The customers may also like for the files in a particular group to be placed on the tape in a specific order. The present invention provides a file system application, such as a software application in many instances, which enables the customer to do this in a relatively simple manner. Thus, the overall performance of the file system is enhanced because the customer is able to access and/or retrieve desired files from tape much more quickly than with a conventional file system where the files are stored to tape randomly relative to how access is desired. This is unique in that the newly provided file system application is configured to specifically work with and/or be integrated with existing file system software in order to achieve the desired improvement to the operation of the underlying file system. More particularly, this unique system capitalizes on the concept of customizable file system extended attributes that are generally enabled within the file system by creating specific file system extended attributes that allow the customer to indicate the desired grouping and ordering of the files to the tape. In doing this, customers only have to deal with the files themselves and not anything with the tapes.

Those of ordinary skill in the art will realize that the following detailed description of the present invention is illustrative only and is not intended to be in any way limiting. Other embodiments of the present invention will readily suggest themselves to such skilled persons having the benefit of this disclosure. Reference will now be made in detail to implementations of the present invention as illustrated in the accompanying drawings. The same or similar reference indicators will be used throughout the drawings and the following detailed description to refer to the same or like parts.

In the interest of clarity, not all of the routine features of the implementations described herein are shown and described. It will, of course, be appreciated that in the development of any such actual implementations, numerous implementation-specific decisions must be made in order to achieve the developer's specific goals, such as compliance with application-related and business-related constraints, and that these specific goals will vary from one implementation to another and from one developer to another. Moreover, it will be appreciated that such a development effort might be complex and time-consuming, but would nevertheless be a routine undertaking of engineering for those of ordinary skill in the art having the benefit of this disclosure.

In computing, a file system is a method and data structure that an operating system uses to control how data is stored and retrieved. Without a file system, data placed in a storage medium would be one large body of data with no way to tell where one piece of data stopped and the next began, or where any particular piece of data was located when it was time to retrieve it. By separating the data into pieces and giving each piece a name, the data is easily isolated and identified. Taking its name from the way a paper-based data management system is named, each group of data is typically referred to as a "file". Thus, the structure and logic rules used to manage the groups of data and their names is called a "file system".

There are many different kinds of file systems. Each one has different structure and logic, properties of speed, flexibility, security, size and more. Some file systems have been designed to be used for specific applications. File systems can be used on numerous different types of storage devices that use different kinds of media. In recent times, hard disk drives have been key storage devices and are projected to remain so for the foreseeable future. Other kinds of media that are used include solid-state drives (SSDs), magnetic tapes, and optical discs.

FIG. 1 is a simplified flowchart that illustrates a representative usage of an embodiment of a file system application having features of the present invention. In various embodiments, the file system application can be provided in the form of a software application that can be used in conjunction with and/or be integrated with existing file system software. Alternatively, the file system application can be provided in the form of a firmware application.

It is appreciated that any of the steps listed in the flowchart of FIG. 1 can be modified, deleted and/or combined in any suitable manner, and/or the order of steps can be changed, without deviating from the intended scope and breadth of the present invention. One or more steps can also be added to the series of steps specifically illustrated and described within the flowchart without deviating from the intended breadth and scope of the present invention.

In some instances, a customer may have a plurality of files that have been saved onto disk, which the customer subsequently wants to save and/or transfer over onto magnetic tape. The present invention provides a system and method for the customer to do just that, while ensuring that the customer's files are grouped together in a desired manner, and are also written and/or saved in a particular order when saved and/or transferred over onto the magnetic tape.

At step 100, a customer ingests a plurality of files into a file system, such as a disk-based file system and/or a Linux file system, in any suitable manner. For example, in one application, the customer can individually save each of the files into the file system. Alternatively, the customer can collectively save a plurality of files into the file system, which can be subsequently split into a plurality of separate files, and/or the customer can merely be provided access to a file system that has a plurality of files saved thereon.

Figure 2A:
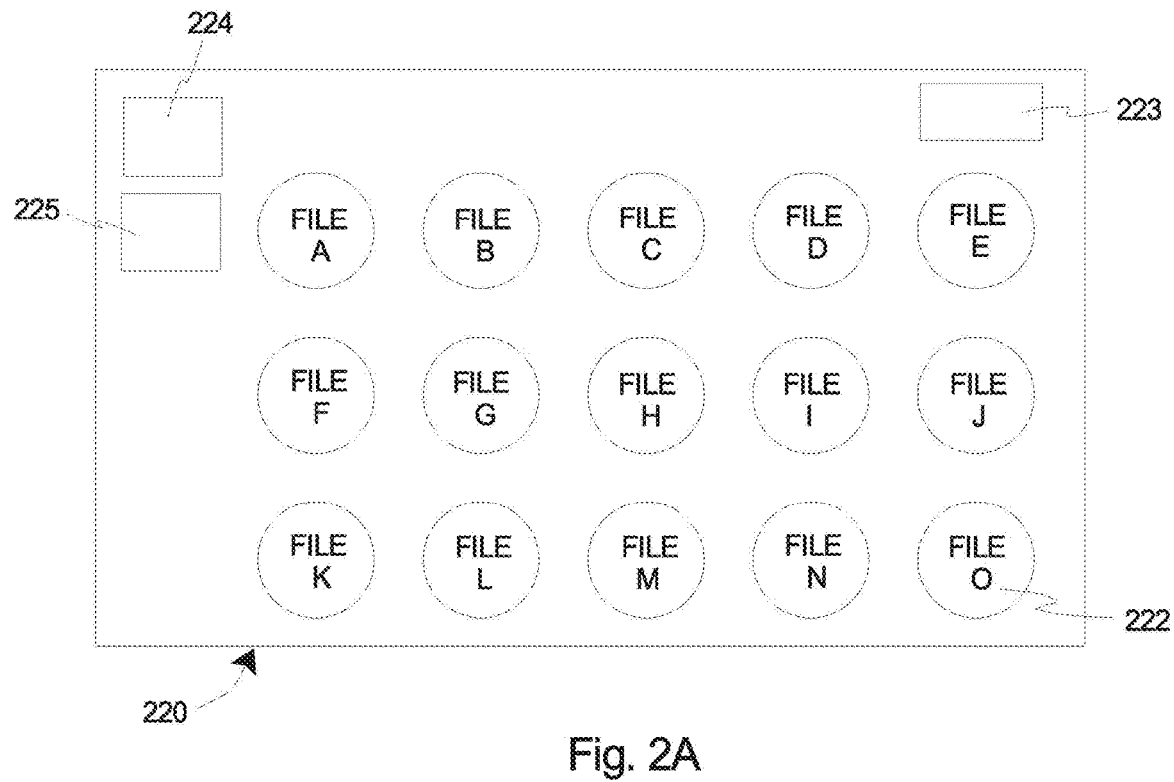
FIG. 2A is a simplified schematic view illustration of an embodiment of a disk-based file system having features of the present invention, the disk-based file system including a plurality of files and a file system application.

Referring now to FIG. 2A, FIG. 2A is a simplified schematic view illustration of an embodiment of a disk-based file system 220 having features of the present invention. As illustrated in this embodiment, the disk-based file system 220 includes a plurality of files 222 (illustrated as a plurality of circles), a system controller 223 (illustrated as a box), a file system application 224 (illustrated as a box), and file system software 225 (illustrated as a box).

In one representative implementation, the customer can have 15 files 222 saved onto the disk-based file system 220, identified somewhat arbitrarily with file names of File A, File B, File C, File D, File E, File F, File G, File H, File I, File J, File K, File L, File M, File N, and File O. Alternatively, each of the files can have any other suitable initial designation.

It is appreciated that a file name is used to identify a storage location in the file system. Most modern file systems allow file names to contain a wide range of characters from the Unicode character set. However, they may have restrictions on the use of certain special characters, disallowing them within file names; those characters might be used to indicate a device, device type, directory prefix, file path separator, or file type.

Returning again to FIG. 1, at step 102, the customer erasure encodes each of the plurality of files as they enter the file system. It is appreciated that the erasure encoding, in some implementations, can result in any files being split into multiple parts, with each file part being labeled as its own separate file on the file system.

In subsequent steps, as described in detail herein below, the customer can utilize the file system application 224 (illustrated in FIG. 2A) to associate particular attributes with each of the files 222 (illustrated in FIG. 2A) as file system extended attributes. More particularly, the file system application 224 can be configured to work with, be integrated with and/or be integrated into existing file system software 225 (illustrated in FIG. 2A), which can include the ability to enable a plurality of file system extended attributes. Thus, in various embodiments, the customer can introduce and/or set particular attribute values for each file 222 as the file system extended attributes. In one particular embodiment, as described, the files 222 can be organized and/or defined based on file system extended attributes such as Group ID (which assigns each file to a particular group of files), File Index (which assigns a specific order to the files within a particular group of files), and Group Ready (which indicates when a group of files is ready to be copied to tape), with a specific attribute value being assigned to each file in each attribute category. Accordingly, the present invention capitalizes on the concept of file system extended attributes that are generally enabled within the file system 220 (illustrated in FIG. 2A) by creating specific file system extended attributes that allow the customer to indicate the desired grouping and ordering of the files 222 to the tape.

At step 104, the customer identifies a first file attribute within the original file system for each of the plurality of files within the file system. For example, in certain embodiments, the customer can assign a Group ID attribute value to each of the files, such that each of the files are associated with a particular group of files. In some embodiments, the Group ID can be represented by the uint64_t type, with valid Group ID attribute values of anywhere from 0 to $2^{64}-1$.

In the present step 104, each of the files are assigned to a particular file group.

Figure 2B:
FIG. 2B is a simplified schematic view illustration of the disk-based file system illustrated in FIG. 2A, with the plurality of files having been grouped together in a desired specified manner through use of Group ID attribute values within the file system application.

Referring now to FIG. 2B, FIG. 2B is a simplified schematic view illustration of the disk-based file system 220 illustrated in FIG. 2A, including the system controller 223 and the file system software 225, with the plurality of files 222 having been grouped together in a desired specified manner, such as through use of Group ID attribute values, within the file system application 224. Stated in another manner, each of the plurality of files 222 can be assigned to a particular group to create at least one file group 226 (three file groups 226 are illustrated in FIG. 2B). More specifically, as shown, each of the plurality of files 222 has been assigned to a particular file group 226, such as Group 1, Group 2 and Group 3 in this particular implementation. For example, continuing with the same representative implementation, each of File B, File C, File G and File I can be assigned by the customer to Group 1; each of File A, File F, File H, File K, File L and File N can be assigned by the customer to Group 2; and each of File D, File E, File J, File M and File O can be assigned by the customer to Group 3. It is appreciated, however, that the disk-based file system 220 can include any number of files 222, and the customer can assign each of the files 222 to any particular file group 226 such that the files 222 are grouped together by the customer in any desired manner so long as each file 222 is assigned to belong to only one file group 226. As so designated by the customer, each file group 226 can include one or more individual files 222.

File systems often have directories (or folders) which allow the user to group files into separate collections. This may be implemented by associating the file name with an index in a table of contents or an inode in a Linux file system. Directory structures may be flat (or linear), or allow hierarchies where directories may contain subdirectories. In certain alternative embodiments, the files 222 can be grouped together based on being initially placed within a particular directory, such that each directory effectively defines its own file group 226.

In some embodiments, Group ID attribute values are considered unique within the file system 220 and therefore should be used to identify only one file group 226 within the file system 220.

In certain embodiments, an unset Group ID attribute value for any given file 222 can indicate that the file 222 is not associated with any particular file group 226 and can thus be stored to tape independently of a file group 226.

It is appreciated that the Group ID attribute value can be assigned to the files 222 at any suitable time, although the Group ID attribute value will typically be assigned to the files 222 after a plurality of files 222 has been ingested into the file system 220. Alternatively, the Group ID attribute value can be assigned to individual files 222 as each individual file 222 is ingested into the file system 220.

Returning again to FIG. 1, at step 106, the customer identifies a second file attribute within the original file system for each of the plurality of files within the file system. For example, in certain embodiments, the customer can assign a File Index attribute value to each of the files, such that the files associated with a particular file group are now organized and/or defined to be in a particular specified order within the given file group. More specifically, the File Index attribute value is set by the customer to specify the order of files to be written to tape within a group. In some embodiments, the File Index can be represented by the uint32_t type, with valid File Index attribute values of anywhere from 0 to $2^{32}-1$.

In some embodiments, File Index attribute values are considered unique within a group and therefore should not be reused within the same group.

Figure 2C:
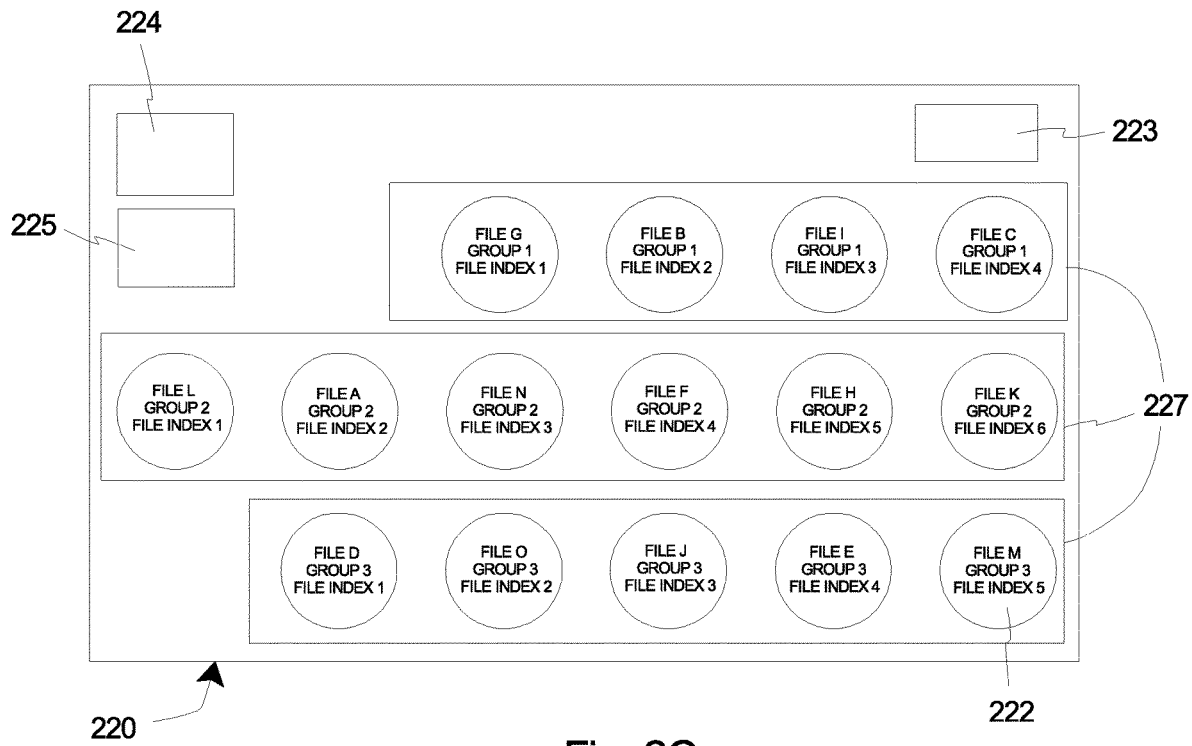
FIG. 2C is a simplified schematic view illustration of the disk-based file system illustrated in FIG. 2A, with the groups of files having been ordered within each group in a desired specified manner through use of File Index attribute values within the file system application.

Referring now to FIG. 2C, FIG. 2C is a simplified schematic view illustration of the disk-based file system 220 illustrated in FIG. 2A, including the system controller 223 and the file system software 225, with the files 222 in each file group 226 (illustrated in FIG. 2B) having been ordered in a desired specified manner, such as through use of File Index attribute values, within the file system application 224 to create at least one ordered file group 227 (three ordered file groups 227 are illustrated in FIG. 2C).

Continuing from the representative implementation described above, (i) within Group 1, the customer can assign the particular files 222 within the file group 226 to be ordered as Group 1: File G, File Index Value 1; File B, File Index Value 2; File I, File Index Value 3; and File C, File Index Value 4; (ii) within Group 2, the customer can assign the particular files 222 within the file group 226 to be ordered as Group 2: File L, File Index Value 1; File A, File Index Value 2; File N, File Index Value 3; File F, File Index Value 4; File H, File Index Value 5; and File K, File Index Value 6; and (iii) within Group 3, the customer can assign the particular files 222 within the file group 226 to be ordered as Group 3: File D, File Index Value 1; File O, File Index Value 2; File J, File Index Value 3; File E, File Index Value 4; and File M, File Index Value 5. Thus, the customer assigns and/or dictates a particular order for the files 222 within any file group 226 in which the customer wants such files 222 saved to tape in order to create the desired ordered file groups 227.

It is appreciated that the File Index attribute value can be assigned to the files 222 at any suitable time, although the File Index attribute value will typically be assigned to the files 222 after a complete file group 226 has been designated within the file system 220. Alternatively, the File Index attribute value can be assigned to the files 222 within a given file group 226 before the file group 226 is complete within the file system 220.

Returning again to FIG. 1, at step 108, the customer then identifies a third file attribute to indicate that a particular file group is ready to be stored to tape. In one embodiment, the third file attribute can be referred to as a Group Ready attribute value, and will entail assigning a particular value to one of the files in the group. In many implementations, the Group Ready attribute value entails assigning a particular value to the last file in the group, although it is appreciated that such value can be assigned to any file within the group to indicate that the group is ready to be stored to tape. In some embodiments, the Group Ready can be represented by the uint8_t type, with valid Group Ready values of 0 or 1. In one embodiment, a Group Ready Value of 0 can be an indication that the group is not ready to be stored to tape, and a Group Ready Value of 1 can be an indication that the group is ready to be stored to tape.

Figure 2D:
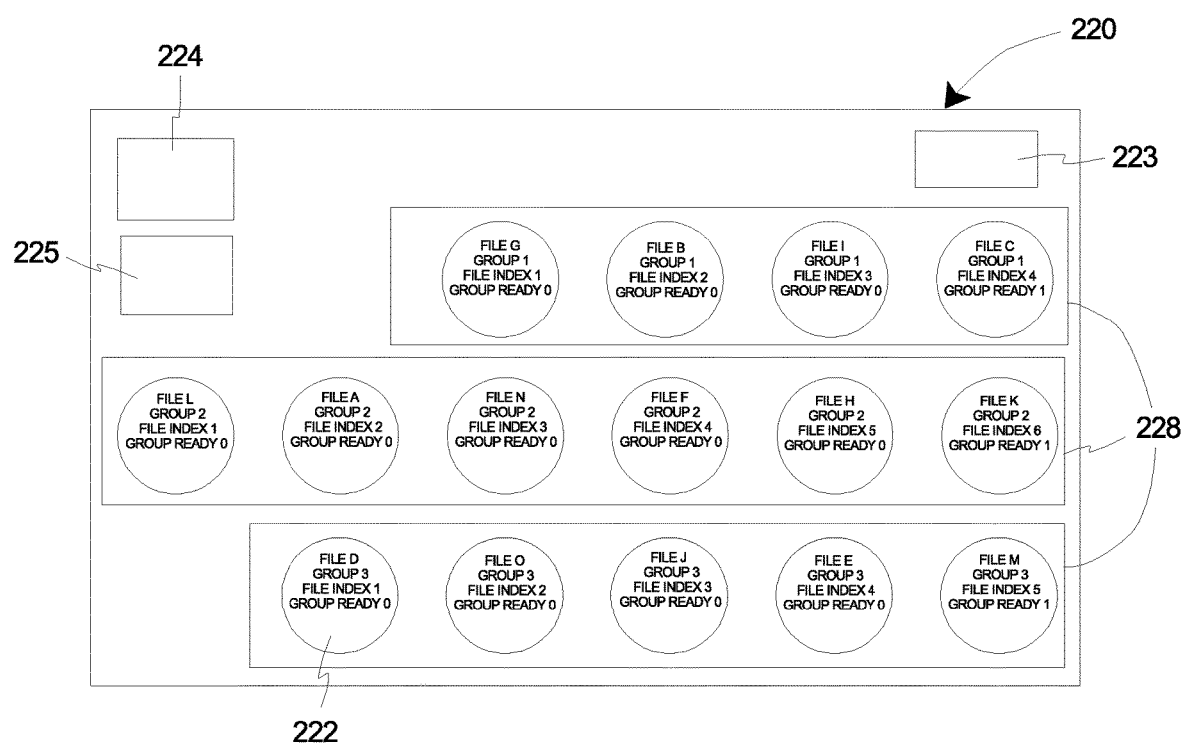
FIG. 2D is a simplified schematic view illustration of the disk-based file system illustrated in FIG. 2A, with the ordered groups of files including an indication of being ready to move to a tape-based file system through use of Group Ready attribute values within the file system application.

Referring now to FIG. 2D, FIG. 2D is a simplified schematic view illustration of the disk-based file system 220 illustrated in FIG. 2A, including the system controller 223 and the file system software 225, with the ordered file groups 227 (illustrated in FIG. 2C) including an indication of being ready to move to a tape-based file system, such as through use of Group Ready attribute values, within the file system application 224 to create at least one ready, ordered file group 228 (three ready, ordered file groups 228 are illustrated in FIG. 2D).

For example, again continuing with the representative implementation described above, when Group 1 is ready to be stored to tape, the customer can assign a Group Ready Value 1 to File C so as to provide File C, File Index Value 4, Group Ready Value 1. Each of the other files 222 within Group 1 can have a Group Ready Value of 0, as only one file 222 in the ordered file group 227 will typically have a Group Ready Value that indicates that the group of files in the ordered file group 227 is ready to be stored to tape.

Similarly, when Group 2 is ready to be stored to tape, the customer can assign a Group Ready Value 1 to File K so as to provide File K, File Index Value 6, Group Ready Value 1. Each of the other files 222 within Group 2 can have a Group Ready Value of 0.

When Group 3 is ready to be stored to tape, the customer can assign a Group Ready Value 1 to File M so as to provide File M, File Index Value 5, Group Ready Value 1. Each of the other files 222 within Group 3 can have a Group Ready Value of 0.

Returning again to FIG. 1, at step 110, each ordered file group that the customer has indicated is ready to store to tape can be stored to tape in the desired specified order. In particular, the system controller, including one or more processors or circuits, can be utilized by the file system, such as a disk-based file system, to write and/or copy the ready, ordered file groups onto the tape-based file system.

Figure 3:
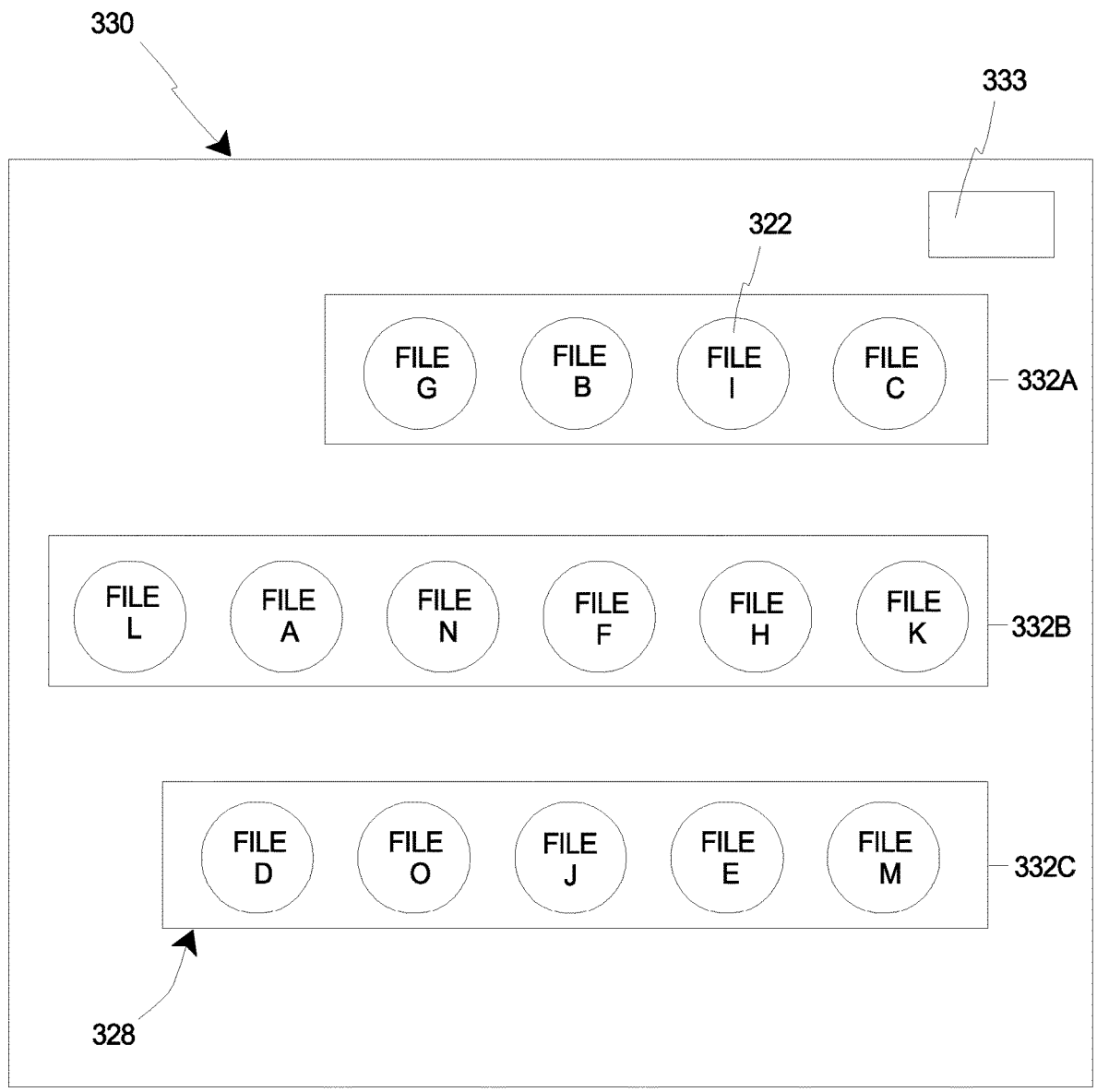
FIG. 3 is a simplified schematic view illustration of an embodiment of a tape-based file system to which the ordered groups of files have been moved and written in the desired specified manner.

Referring now to FIG. 3, FIG. 3 is a simplified schematic view illustration of an embodiment of a tape-based file system 330 to which the ready, ordered file groups 328 have been moved and written in the desired specified manner. As illustrated, the tape-based file system 330 includes a system controller 333 (illustrated as a box), including one or more processors or circuits, that is configured to control various operations of the tape-based file system 330.

In particular, again continuing with the representative implementation described above, Group 1 files 322 (illustrated as a plurality of circles) can be stored to a first tape 332A in the desired order of File G, File B, File I, and File C; Group 2 files 322 can be stored to a second tape 332B in the desired order of File L, File A, File N, File F, File H, and File K; and Group 3 files 322 can be stored to a third tape 332C in the desired order of File D, File O, File J, File E, and File M.

It is appreciated that, although each of the ordered file groups 328 illustrated in FIG. 3 has been written to a separate tape, more than one ordered file group 328 can be written to the same tape.

At an appropriate and/or desired time, the customer or user can then access and/or retrieve any or all of the ordered file groups 328 from the tapes 332A-332C included within the tape-based file system 330. In particular, the customer or user can transmit a request to access and/or retrieve any or all of the ordered file groups 328 from the tapes 332A-332C to the system controller 333; and the system controller 333 can then access and/or retrieve any or all of the ordered file groups 328 from the tapes 332A-332C on behalf of the customer or user. As described in detail herein, because the present invention enabled the customer or user to have the files 222 (illustrated in FIG. 2A) organized, defined, copied and stored to the tape-based file system 330 in a specific desired order, the customer or user is then able to access and/or retrieve any or all of the ordered file groups 328 from the tapes 332A-332C in a much quicker and more efficient manner, thereby saving time and money for the customer or user. Thus, the overall operation of the disk-based file system 220 (illustrated in FIG. 2A) and the tape-based file system 330 has been greatly improved relative to conventional file systems.

In summary, the present invention introduces a file system application that defines and/or creates three attribute values to be associated with each file on a file system such as a Linux file system: Group ID (this attribute value will be set by the customer or user to associate a file with a particular group), File Index (this attribute value will be set by the customer or user to specify the order of files to be written to tape within a group), and Group Ready (this attribute value will be set on a file in the group by the customer or user to indicate that the group is ready to be stored to tape). These attribute values are set by the customer or user on the files as file system extended attributes so that file groups are saved to tape in a particular order as designated by the customer or user.

The file system application encompassed within the present invention is uniquely configured to work with and/or be integrated with existing file system software to improve operation of the underlying file systems by enabling access to specific files in a tape file system to be accomplished by the customer in a much quicker and more efficient manner.

Thus, through use of the file system application described herein, (i) the file system application will track files as they are ingested into the system; (ii) when the last file in a group has the Group Ready attribute set to 1, the files in that group will be considered ready to store to tape; and (iii) the file system application will then gather the files with the same Group ID value, order them by their File Index value, and write the files in that order to tape.

It is understood that although a number of different embodiments of the file system 220 and/or the file system application 224 have been illustrated and described herein, one or more features of any one embodiment can be combined with one or more features of one or more of the other embodiments, provided that such combination satisfies the intent of the present invention.

While a number of exemplary aspects and embodiments of the file system 220 and/or the file system application 224 have been discussed above, those of skill in the art will recognize certain modifications, permutations, additions and sub-combinations thereof. It is therefore intended that the following appended claims and claims hereafter introduced are interpreted to include all such modifications, permutations, additions and sub-combinations as are within their true spirit and scope.

What is claimed is:

1. A method for copying a plurality of files from a first file system to a tape-based file system, the first file system storing the plurality of files, the method comprising:
   using a processor to perform:
   assigning each of the plurality of files within the file system to a group with a file system application to create multiple file groups including a first file group and a second file group different from the first file group;
   receiving user input indicating ordering of files with respect to the multiple file groups, the user input indicating a first ordering of files in the first file group and a second ordering of files in the second file group;
   defining, based on the user input, an ordering of the files in the multiple file groups with the file system application to create multiple ordered file groups including a first ordered file group and a second ordered file group; and
   copying the multiple ordered file groups, including the first ordered file group and the second ordered file group, from the first file system to the tape-based file system.

2. The method of claim 1, further comprising: ingesting the plurality of files into the first file system.

3. The method of claim 1, wherein assigning includes each of the plurality of files being assigned to only one of the multiple file groups.

4. The method of claim 1, wherein assigning each of the plurality of files to a group includes assigning a Group ID attribute value to each of the plurality of files with the file system application to create the multiple file groups; and
   wherein each Group ID attribute value is used to identify only one file group.

5. The method of claim 1, wherein defining the ordering includes assigning a File Index attribute value to the files in the multiple file groups with the file system application to create the multiple ordered file groups.

6. The method of claim 1, further comprising:
   indicating when the multiple ordered file groups are ready to be written to tape with the file system application to create multiple ready, ordered file groups prior to copying the multiple ordered file groups to the tape-based file system.

7. The method of claim 6 wherein indicating includes assigning a Group Ready attribute value to one of the files in each of the multiple ordered file groups with the file system application.

8. The method of claim 1, wherein the tape-based file system includes a processor; and
   wherein the method further comprises retrieving the multiple ordered file groups from the tape-based file system utilizing the processor of the tape-based file system.

9. A system for copying a plurality of files to a tape-based file system, the system comprising:
   a processor; and
   a file system application that, when executed by the processor, performs:
   assigning each of the plurality of files within the file system to a group to create multiple file groups, including a first file group and a second file group different from the first file group;

receiving user input indicating ordering of files with respect to the multiple file groups, the user input indicating a first ordering of files in the first file group and a second ordering of files in the second file group;

defining, based on the user input, an ordering of the files in the multiple file groups to create multiple ordered file groups including a first ordered file group and a second ordered file group; and copying the multiple ordered file groups, including the first ordered file group and the second ordered file group, from the file system to the tape-based file system.

10. The file system of claim 9, wherein the file system is a disk-based file system.

11. The file system of claim 9, further comprising:
file system software,
wherein the file system application is a software application; and
wherein the file system application is integrated with the file system software.

12. The file system of claim 9, wherein each of the plurality of files is assigned to only one of the multiple file groups.

13. The file system of claim 9, wherein assigning each of the plurality of files includes using the file system application to assign a Group ID attribute value to each of the plurality of files to create the multiple file groups; and
wherein each Group ID attribute value is used to identify only one file group.

14. The file system of claim 9, wherein defining includes using the file system application to assign a File Index attribute value to each of the files in the multiple file groups to create the multiple ordered file groups.

15. The file system of claim 9, wherein the file system application is further configured to indicate when the multiple ordered file groups are ready to be written to tape to create at least one ready, ordered file group prior to copying the multiple ordered file groups to the tape-based file system.

16. The file system of claim 15, wherein indicating includes using the file system application to assign a Group Ready attribute value to one of the files in each of the multiple ordered file groups.

17. The file system of claim 9, wherein the tape-based file system includes a processor that is configured to selectively retrieve each of the multiple ordered file groups from the tape-based file system.

18. A storage medium storing a file system software application for copying a plurality of files within a file system to a tape-based file system, the file system application when executed by a processor, performs:

assigning each of the plurality of files within the file system to a group to create multiple file groups, including a first file group and a second file group different from the first file group;

receiving user input indicating ordering of files with respect to the multiple file groups, the user input indicating a first ordering of files in the first file group and a second ordering of files in the second file group;

defining, based on the user input, an ordering of the files the multiple file groups to create multiple ordered file groups including a first ordered file group and a second ordered file group; and copying the multiple ordered file groups, including the first ordered file group and the second ordered file group, from the file system to the tape-based file system.

* * * * *